Sept. 15, 1959    H. F. HAGEN ET AL    2,904,316
COLD ROOM COOLER FOR MEATS AND OTHER PERISHABLE PRODUCTS
Filed July 26, 1955

INVENTORS.
HAROLD F. HAGEN
WILLIAM F. HAGEN
BY
Coons, McDougall,
Williams & Hersh
attorneys

United States Patent Office 2,904,316
Patented Sept. 15, 1959

2,904,316

COLD ROOM COOLER FOR MEATS AND OTHER PERISHABLE PRODUCTS

Harold F. Hagen, Wilmette, and William F. Hagen, Northbrook, Ill., assignors to The Union Stock Yard and Transit Company of Chicago, Chicago, Ill., a corporation of Illinois Application July 26, 1955, Serial No. 524,547

2 Claims. (Cl. 257—137)

This invention relates to the refrigeration of meat and other perishable food and horticultural products, and it relates more particularly to the refrigeration of meat and the like perishable products for maintaining them at safe storage temperature.

It is an object of this invention to produce an economical and efficient system for the refrigeration of perishable products such as beef carcasses and the like, and it is a related object to provide equipment for use in achieving same.

This and other objects and advantages of this invention will hereinafter be described, and for purposes of illustration, but not of limitation, an embodiment of the invention is shown in the accompanying drawings, in which.

Figure 1:
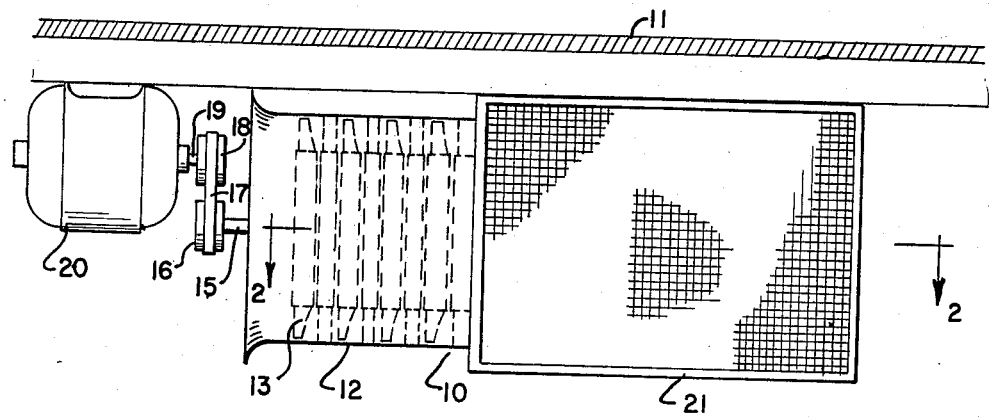
Figure 1 is a schematic elevational view, partially in section, of a refrigeration device employed in the practice of this invention.
Figure 2:
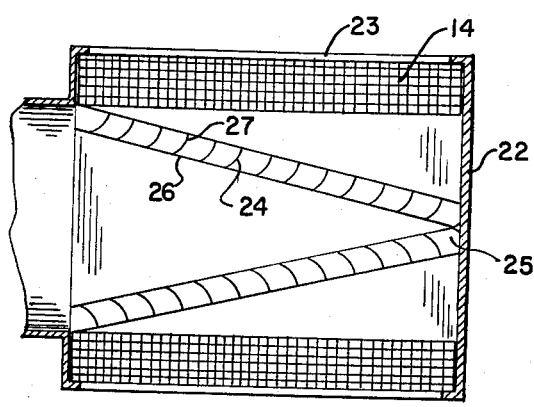
Figure 2 is a sectional plan view of a portion of the refrigeration device shown in Figure 1.

In the Morrison Patent No. 2,705,678 description is made of a process for the refrigeration of perishable products, such as freshly killed and cleaned carcasses of beef delivered from the kill floor at about 100 degrees F. and reduced in temperature to a safe level of about 48 degrees F. in about 24 hours in the cooler. In the process described, utilization is made of a turbo refrigeration unit which recirculates air from within the refrigerated space and which, during recirculation, subjects the air to a sequence of operations including a compression cycle in which the air entering the compression fan is increased in pressure to about 28 inches of water or to about 0.5–3 pounds per square inch pressure. At the same time, the heat of compression raises the temperature of the compressed air about 6–36 degrees F. over and above the temperature of the air entering the compression stage.

From the compression stage, the compressed air is directed through a cooling section maintained at a temperature sufficient to extract heat of compression from the air, but without cooling the air to a temperature below its dew point and preferably to a temperature at a higher level than the temperature of the incoming air to the compression fan. As a result, the air is reduced in temperature without reducing the amount of moisture below that present in the air introduced into the compression stage.

From the cooling section, the cooled and compressed air is introduced into a turbo expansion unit wherein the air is permitted to expand down to atmospheric pressure while doing work, with the result that the air is reduced in temperature by an amount within the range between 4–25 degrees F., depending upon the amount of the original compression. Upon reduction of the air to a temperature below that at which the air enters the compression stage without effecting separation of moisture therefrom, the amount of moisture present in vapor form in the air issuing from the expansion turbine is more than sufficient to saturate the air, with the result that the cold air reintroduced into the refrigerated space is supersaturated with moisture in vapor form, or the equivalent thereof. It is desirable in the so-called "steady state" to provide for an amount of supersaturation which will prevent reduction to the point where an unsaturated state will develop during travel of the air through the refrigerated space.

Because the refrigerated air introduced for circulation through the refrigerated space has the maximum amount of moisture vapor that it is capable of holding, the refrigerated air within the refrigerated space can be moved about the beef carcasses at high velocity, heat transfer from the carcasses to the air is more rapid with the result that the carcasses can be reduced down to a safe temperature of 48 degrees F. within 24 hours, as distinguished from the considerably greater length of time required for processes heretofore employed. Such increase in the rate of cooling which is permitted with air incapable of taking up moisture is achieved with less loss in weight by the evaporation of moisture from the carcasses and with improved appearance and condition of the meat. In fact, the very rapid movement of the supersaturated cold air about the carcasses permits closer spacing of the carcasses in the cooler, thereby to increase the capacity of the cooler by as much as 20% over that available in the same space serviced with brine spray or the like for refrigeration purposes.

It has been found that the cost and operation of the turbo refrigeration unit is greater than the cost for the brine system of the type heretofore employed for the refrigeration of freshly killed carcasses of beef, but that this greater cost in the operation of the turbo chill system is more than offset by the savings in money in the difference between the weight loss of the meat serviced in a turbo chill system as compared to the considerably greater loss in weight experienced in the brine system. This difference in savings, from the standpoint of weight loss and its corresponding savings in money, is secured in addition to the marked savings in time for reducing the freshly killed beef to a safe temperature and the greater capacity and output of the refrigerated space serviced by the turbo chill system.

Figure 3:
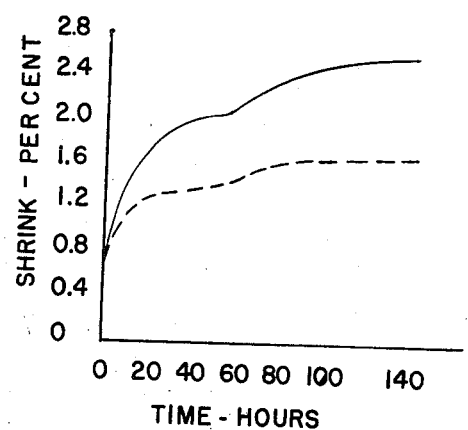
Figure 3 is a chart comparing shrinkage calculated in loss in weight by percent of meat carcasses against the time that the meat carcasses are exposed to cooling by the brine and by the turbo chill methods.

However, once the product has been reduced to a safe temperature by refrigeration, then the only real advantage in the use of a turbo chill system for refrigerating the storage space is based upon the savings determined by the differences in weight loss as compared to other refrigeration systems which might be employed. With reference to the chart in Figure 3 of the drawing, the difference in weight loss during the first 24–30 hours of cooling the carcasses to a safe storage temperature of 48 degrees by the turbo chill system is in the order of about 1.3% by weight as compared to the weight loss of 2% by weight during an equivalent time in which the carcasses are stored in a refrigerated space serviced by cold brine. This represents a savings of about .7% by weight which constitutes a tremendous advantage from a cost standpoint in favor of the turbo chill system and more than offsets the greater expense for operation of the turbo refrigeration unit.

On the other hand, the difference in weight loss by the evaporation of moisture of the carcasses after the carcasses have been reduced to a temperature below 48 degrees F. is such that continued use of the turbo refrigeration system for holding the product in a refrigerated state becomes uneconomical by comparison with other less expensive systems. For example, again referring to the chart of Figure 3, the weight loss after 80 hours of refrigeration in a turbo chill system is about 1.65% by weight as compared to a weight loss of 2.4% by weight in equivalent time in a brine system. While the difference is about 0.75% and is considerable from the overall standpoint, the increase in differential loss over and above that which occurs after 30 hours in the respective refrigeration units is only the difference between .65% at 30 hours and .75% at 80 hours, or 0.1% for the next 50 hours over and above the initial short period for cooling the meat to a safe temperature by the turbo chill process.

For a savings of 0.1%, it is uneconomical to use the more expensive turbo chill system, and it is impractical and uneconomical to tie up the space serviced by the turbo refrigeration unit to hold the chilled beef to temperature instead of making more efficient use of this space for rapidly chilling freshly killed carcasses.

In accordance with the practice of this invention, a refrigeration system is provided in which utilization is made of the refrigerated space serviced by a turbo refrigeration system of the type described to achieve rapid reduction in temperature of freshly killed carcasses with corresponding savings in the amount of moisture loss by desiccation of the carcasses. After the carcasses are chilled to the temperature at which it is desired to hold the product, that is, about 48 degrees F. for beef, the carcasses are unloaded from the spaced serviced by the turbo refrigeration unit and transferred into a cold room which is serviced by a system which continues to operate with positive circulation of air through the refrigerated space, but in which the air is merely recirculated through cooling coils for maintaining the desired temperature condition with very little temperatre differential and with moving air being maintained at about saturation.

For this purpose, use is made of a refrigeration unit in the form of a cylindrical housing 10 which may be suspended from the ceiling 11 between the center posts, as in the turbo chill unit described and claimed in our copending application Ser. No. 498,196, filed on March 31, 1955. The housing 10 is formed with a fan section 12 comprising a multiple-bladed circulating fan 13, corresponding to a multiple-stage fan compressor, adapted positively to draw air from the refrigerated space into the housing for circulating the air endwise, axially through the housing into communication with cooling coils 14 for reducing the temperature of the air before being forced back out into the room for circulation to keep the room at the desired temperature level for refrigeration.

The multiple-bladed fan is mounted for rotational movement on a driven shaft 15 having a pulley 16 on the end thereof outwardly of the housing, and which is connected by an endless belt 17 to a pulley 18 on the end of a driving shaft 19 of a driving motor 20 for circulating the fan blades. Instead of a multiple-blade, multiple-stage fan assembly, use may be made of any circulating fan capable of the desired capacity for displacing large volumes of air from the room through the fan inlet to the outlet in communication with the refrigerating section.

The refrigerating section into which the air is introduced by the fan comprises a housing 21 which is formed with an imprevious end wall 22 in axial alignment with the fan to block passage of air therethrough. The housing is formed with open side walls 23 completely lined with a bank of cooling coils 14 so that the air issuing from the fan section with considerable force is enabled to pile endwise through a bank of coils in alignment therewith, whereby insufficient cooling would be achieved unless the back of the coils were formed of such depth as to provide for sufficient cooling but with a large pressure drop across the cooling section.

Instead, the air issuing from the fan section at high velocity is caused to turn through an angle of 90 degrees for passage laterally through the side walls of the housing where greater area is available to provide maximum cooling surface with a minimum depth of cooling coil, and wherein heat transfer may be effected while the air is traveling at lower velocity, thereby to achieve conditions most effective for uniform air distribution.

By way of still further improvement, the interior of the housing is formed with stationary turning blades 24 arranged as a wedge section having its base at the front edge of the housing 21 about the fan section inwardly of the cooling coils and having its edge 25 at the center at the far end of the housing with the bladed portions being formed of curvilinear vanes having their inner ends 26 extending forwardly in the direction toward the fan section, and their outer ends 27 extending laterally in the direction towards the cooling coils. While in this position, the turning vanes function in a manner to peel off layers of the air stream issuing axially from the fan section to turn the stream smoothly and efficiently, without turbulence, for continued lateral movement in relatively equal proportions and in equal distributions and at a slowed speed into the adjacent cooling coils.

The air is cooled upon passage through the coils by a heat exchange system which can make use of a refrigerant such as brine, Freon, ammonia vapors, or like refrigerants or liquids. Enough air is recirculated to cause the air to return to the refrigeration unit at about 34 degrees F. For this purpose it is sufficient to make use of brine or other refrigerant, circulated at about 28 degrees F. through the coils for reducing the temperature of the air issuing from between the coils to a temperature of about 32 degrees F. These conditions, available in a forced circulation system of the type described, are to be distinguished over a brine system of the type heretofore employed which relies on natural convection for air flow and which must, as a result, make use of cooling surfaces reduced to a temperature of about 20 degrees F. in order to maintain the temperature within the refrigerated space at an average of about 34 degrees F.

When, as in the system described, air at 32 degrees F. is saturated over water, the degree of unsaturation in the refrigerated space in which air is circulated at a rate return of 34 degrees F. is so small as to actually cause very little increase in the rate of the weight loss of the carcasses by comparison with that which occurs in a refrigerated space serviced by the turbo refrigeration system. When, on the other hand, a brine system of the type heretofore employed is used to service the refrigerated space, reliance must be had upon the temperature differential to cause air flow, with the result that it is necessary to make use of brine at 20 degrees F. for return of air at about 36 degrees F. Saturation of the air over brine at 36 degrees F. provides for a spread of greater than 4 degrees by comparison of saturation of air over water and the difference of moisture content goes into the brine.

It will be apparent from the foregoing description that we have provided a new and improved means for economically and efficiently chilling beef carcasses to a safe temperature and for holding the beef carcasses at the desired safe temperature for storage over extended periods of time in which use is made of a turbo refrigeration system to achieve initial reduction in temperature with considerable savings in weight loss and with considerable improvement of the carcasses being cooled, and in which use is made of a refrigeration system which operates less expensively than the turbo refrigeration system, but which continues to operate on the principle of positive circulation of air at high velocity through the refrigerated space and under conditions which permit maintenance of the air circulated through the refrigerated space at about saturation. By the combination of refrigeration systems, it is possible to achieve rapid and efficient chilling of freshly killed beef and to maintain the freshly killed beef at a sufficient temperature with savings in the cost of operation and with more complete retention of the natural moisture and juices of the meat and the characteristics of the meat.

It will be understood that the combination of systems of the type described for chilling meat and for maintaining the chilled meat at a safe temperature may be employed equally well with other meat products which require different temperatures for storage, and for use in servicing refrigerated spaces in which other food products such as farm products, dairy products and horticultural products are stored and shipped.

It will be further understood that changes may be made in the cold room refrigeration unit described and claimed as a part of this invention, and that changes may be made in the details of construction and arrangement thereof without departing from the spirit of the invention, especially as defined in the following claims.

1. A cold room cooler of the type described comprising an elongate housing having a fan section at one end and a cooling section communicating with the outlet of the fan section, a circulating fan in the fan section for withdrawing air from within the room and from which it issues into the cooling section as a stream of air traveling at high velocity in an axial direction, the cooling section being formed with side walls parallel to the axially traveling stream of air, a bank of cooling coils lining the side walls, and turning vanes stationarily arranged in longitudinally spaced apart relation in a wedge pattern having its base in the end portion of the housing about the outlet from the fan section and inwardly of the cooling coils and the edge at the center of the end portion of the housing farthest from the circulating fan to extend across the path of travel of the air stream and with the leading end portions of the vanes extending substantially in axial alignment with the air stream and the trailing end portions extending in the direction toward the side walls to turn the stream of air smoothly and uniformly into the side walls for passage laterally through the cooling coils into the room, and means for circulating refrigerant through the cooling coils.

2. A cold room cooler of the type described comprising an elongate housing having a fan section at one end and a cooling section communicating with the outlet of the fan section, a circulating fan in the fan section for withdrawing air from within the room and from which it issues into the cooling section as a stream of air traveling at high velocity in an axial direction, the cooling section being formed with open side walls parallel to the axially traveling stream of air, a bank of cooling coils lining the side walls, and a plurality of axially spaced apart turning vanes inwardly offset one from the other adjacent thereto to extend in a wedge pattern having its base in the end portion of the housing about the outlet from the fan section and inwardly of the cooling coils extending across the path of travel of the air stream, the vanes having their leading end portions extending substantially in axial alignment with the air stream and their trailing end portions extending in the direction toward the side walls to turn the stream of air smoothly and uniformly into the side walls for passage laterally through the cooling coils into the room, and means for circulating refrigerant through the cooling coils.

References Cited in the file of this patent

UNITED STATES PATENTS

| | | |
|---|---|---|
| 1,465,028 | Stacey | Aug. 14, 1923 |
| 2,446,879 | Kennedy | Aug. 10, 1948 |
| 2,463,835 | Warren | Mar. 8, 1949 |
| 2,498,342 | Petticrew | Feb. 21, 1950 |
| 2,526,243 | Lange | Oct. 17, 1950 |
| 2,697,428 | Norman et al. | Dec. 21, 1954 |
| 2,705,678 | Morrison | Apr. 5, 1955 |
| 2,768,814 | Frey et al. | Oct. 30, 1956 |

OTHER REFERENCES

"The National Provisioner," October 2, 1954, pages 54, 55, 56, 58, and 83, article entitled Out of the Mists, A New Beef Chill.